United States Patent
Jaunky et al.

(10) Patent No.: US 9,938,432 B2
(45) Date of Patent: Apr. 10, 2018

(54) POLYSILOXANES AS ANTI-ADHESIVE AND DIRT-REPELLANT ADDITIVES, METHOD FOR THE PRODUCTION AND USE THEREOF

(71) Applicant: BYK-Chemie, GmbH, Wesel (DE)

(72) Inventors: Wojciech Jaunky, Wesel (DE); Wolfgang Griesel, Hamminkeln (DE)

(73) Assignee: BYK Chemie, GmbH, Wesel (DE)

( * ) Notice: Subject to any disclaimer, the term of this patent is extended or adjusted under 35 U.S.C. 154(b) by 0 days.

(21) Appl. No.: 15/521,812

(22) PCT Filed: Nov. 20, 2015

(86) PCT No.: PCT/EP2015/077265
§ 371 (c)(1),
(2) Date: Apr. 25, 2017

(87) PCT Pub. No.: WO2016/079319
PCT Pub. Date: May 26, 2016

(65) Prior Publication Data
US 2017/0247572 A1  Aug. 31, 2017

(30) Foreign Application Priority Data
Nov. 20, 2014 (EP) .................................. 14194191

(51) Int. Cl.
| | | |
|---|---|---|
| *C08G 77/14* | (2006.01) | |
| *C09D 183/10* | (2006.01) | |
| *C08L 83/10* | (2006.01) | |
| *C09D 163/00* | (2006.01) | |
| *C08L 63/00* | (2006.01) | |
| *C08G 77/48* | (2006.01) | |
| *C08G 77/46* | (2006.01) | |
| *C08G 77/458* | (2006.01) | |
| *B32B 27/28* | (2006.01) | |
| *C09D 5/00* | (2006.01) | |

(52) U.S. Cl.
CPC ............ *C09D 183/10* (2013.01); *C08G 77/14* (2013.01); *C08G 77/458* (2013.01); *C08G 77/46* (2013.01); *C08G 77/48* (2013.01); *C08L 63/00* (2013.01); *C08L 83/10* (2013.01); *C09D 163/00* (2013.01); *B32B 27/283* (2013.01); *C09D 5/00* (2013.01)

(58) Field of Classification Search
USPC .............................................. 528/27, 31, 32
See application file for complete search history.

(56) References Cited

U.S. PATENT DOCUMENTS

| | | | |
|---|---|---|---|
| 5,082,891 A | 1/1992 | Morita et al. | |
| 5,169,919 A | 12/1992 | Terae et al. | |
| 5,283,309 A * | 2/1994 | Morita ................... | C08G 77/50 528/15 |
| 5,512,640 A | 4/1996 | Osawa et al. | |
| 6,342,303 B1 | 1/2002 | Dopico et al. | |
| 7,122,599 B2 | 10/2006 | Haubennestel et al. | |
| 8,304,077 B2 | 11/2012 | Bubat et al. | |
| 2010/0022704 A1 | 1/2010 | Morita et al. | |
| 2010/0225010 A1 | 9/2010 | Katayama | |
| 2013/0041098 A1 | 2/2013 | Arkles et al. | |
| 2013/0289134 A1 | 10/2013 | Hans et al. | |
| 2014/0187649 A1 | 7/2014 | Tamura et al. | |

FOREIGN PATENT DOCUMENTS

| | | |
|---|---|---|
| DE | 10 2008 031 901 A1 | 1/2010 |
| EP | 1 193 303 B1 | 3/2005 |
| EP | 1 985 645 A2 | 10/2008 |
| EP | 2 226 361 A1 | 9/2010 |
| EP | 2 716 685 A1 | 4/2014 |
| WO | WO 2008/041459 A1 | 4/2008 |
| WO | WO 2009/086079 A2 | 7/2009 |

OTHER PUBLICATIONS

PCT/EP2015/077265—International Search Report, dated Dec. 15, 2015. English Translation.
PCT/EP2015/077265—International Written Opinion, dated Dec. 15, 2015. English Translation.
PCT/EP2015/077265—International Preliminary Report on Patentability, dated May 23, 2017.
Ma, Song-Qi, et al. "Modification of Epoxy Resins with Polyether-g-polysiloxanes", Iranian Polymer Journal, 2010, vol. 19, No. 3, pp. 185-196.

\* cited by examiner

*Primary Examiner* — Marc S Zimmer
(74) *Attorney, Agent, or Firm* — Curatolo Sidoti Co., LPA; Joseph G. Curatolo; Salvatore A. Sidoti

(57) ABSTRACT

The invention relates to polysiloxanes which can be obtained by adding at least one monovinyl functional polysiloxane and at least one epoxy functional, monovinyl functional component to a Si—H functional polysiloxane. The invention also relates to the production of polysiloxanes, to compositions containing said polysiloxanes, to the use of the compositions in a coating method and to substrates coated with the composition and to the use of the polysiloxanes as additives for finishing surfaces of hardened compositions with anti-adhesive properties.

20 Claims, No Drawings

POLYSILOXANES AS ANTI-ADHESIVE AND DIRT-REPELLANT ADDITIVES, METHOD FOR THE PRODUCTION AND USE THEREOF

CROSS REFERENCE TO RELATED APPLICATIONS

This application is a national stage application of International Application No. PCT/EP2015/077265, filed 20 Nov. 2015, which claims priority from European Patent Application No. 14194191.4, filed 20 Nov. 2014, which applications are incorporated herein by reference.

The present invention relates to epoxy-functional polysiloxanes which are preparable by the addition of monovinyl-functional polysiloxanes and monovinyl-functional epoxy compounds onto alkyl-hydrogen-polysiloxanes. The present invention further relates to the use of the products as additives in coating material compositions, polymeric molding compounds or thermoplastics, as surface-modifying agents, for example, for instance as flow control and leveling agents, lubricants, agents for improving the scratch resistance, hydrophobizing agents, and agents for improving the cleaning properties of the additized material, for example.

The addition of silicone-containing compounds to coating materials and polymeric molding compounds or thermoplastics is known (Lackadditive by Johan Bieleman, Weinheim; New York; Chichester; Brisbane; Singapore; Toronto: Wiley-VCH, 1998), in order, for example, to produce or enhance substrate properties such as the wetting, the leveling, and the lubricity properties of the coating surfaces.

A wide variety of different polysiloxanes are used in a multiplicity of technical fields for a host of different purposes. For example, the addition of comblike polysiloxanes to coating materials, polymeric molding compounds or thermoplastics is known for the purpose of obtaining certain properties, such as improved scratch resistance, for example, or of obtaining an easy-to-clean surface.

EP 1193303 B1, for instance, describes coatings having antiadhesive, dirt-repellent properties, these coatings being obtained from coating materials additized with 0.1 to 10 wt %, based on the solids content of the coating material, of a polymer which possesses a weight-average molecular weight of 2000 to 200 000 and which consists of a polymeric base molecule and also polydiorganosiloxane side chains bonded covalently to the base molecule via Si—C bonds, the side chains having a weight-average molecular weight between 1000 and 30 000 and a fraction of 5 to 25 wt %, based on the total weight of the branched polymer.

US 2013/0289134 describes comb copolymers based on an epoxy-amine backbone with polysiloxane chains grafted thereto. The coatings produced therefrom have easy-to-clean surfaces.

Epoxy-functional polysiloxanes and processes for preparing them are described in U.S. Pat. No. 5,512,640. Likewise known is the use thereof for modifying resin compositions and composite materials. For example, U.S. Pat. No. 6,342,303 B1 describes epoxy-functional polysiloxanes for modifying phenolic resins, for the purpose of improving the interlaminar shear strength after exposure to temperature and moisture.

The improvement to the fracture toughness of thermoset resins such as epoxy resins has been described for example in Iranian Polymer Journal 19 (3) 2010, pages 185 to 196. Through the use of polyether-modified polysiloxanes, an improvement is achieved in the fracture toughness, impact toughness, and delamination resistance of the composite materials. The modification of the polysiloxane with polyether chains raises the compatibility with epoxy systems.

The object of the present invention was that of improving the surface properties of cured compositions, especially cured coating materials, polymeric molding compounds or thermoplastics. More particularly the object was to provide coating materials, polymeric molding compounds or thermoplastics which exhibit improved antiadhesive and/or dirt-repellent effect. Furthermore, the additives added in order to impart these improved properties are as far as possible not to detract from the other properties of the coating materials, polymeric molding compounds or thermoplastics. The additives added are to be able to develop their activity in relatively small quantities, moreover. The coating materials, polymeric molding compounds or thermoplastics, additionally, are to largely retain their antiadhesive and/or dirt-repellent effect for a long period, of up to several years, for example. This ought also to include the permanence of the antiadhesive and/or dirt-repellent effect over a plurality of cleaning cycles.

Surprisingly it has emerged that the objects described above are achieved by means of polysiloxanes which are preparable by the addition of at least one monovinyl-functional polysiloxane and at least one epoxy-functional, monovinyl-functional component onto an Si—H-functional polysiloxane. The aforementioned epoxy-functional polysiloxanes are also referred to herein as polysiloxanes of the invention. The polysiloxanes of the invention customarily no longer have any Si—H groups. The polysiloxanes of the invention are preferably comblike in construction.

Coating materials, polymeric molding compounds or thermoplastics to which these adducts are added have excellent antiadhesive and dirt-repellent properties. The adducts of the invention are highly compatible with the customary ingredients of coating materials, polymeric molding compounds, and thermoplastics, and customarily do not detract from their other properties. The epoxy-functional polysiloxanes of the invention can be added to the coating materials, polymeric molding compounds or thermoplastics in relatively small amounts (additive amounts) and develop their activity even in these small amounts. The physical properties of the original coating materials, polymeric molding compounds or thermoplastics, in respect of corrosion control, gloss retention, and weathering resistance, for example, are unaffected by the low concentrations of the additive. Coating materials, polymeric molding compounds or thermoplastics which comprise the adducts of the invention also exhibit the desired properties in general over a period of several years, and also retain these properties over a plurality of cleaning cycles.

Starting Compounds
Si—H-Functional Polysiloxanes

The Si—H-functional polysiloxanes may be catenated polysiloxanes, cyclic polysiloxanes, branched polysiloxanes or crosslinked polysiloxanes. Preferably they are catenated or branched polysiloxanes. More preferably they are catenated polysiloxanes. The Si—H-functional polysiloxane is very preferably an alkyl-, aryl- or aralkyl-hydrogen-polysiloxane. With especial preference it is an alkyl-hydrogen-polysiloxane where the alkyl groups it carries are $C_1$-$C_{14}$ alkyl groups, preferably $C_1$-$C_4$ alkyl groups, and very preferably methyl groups. The alkyl groups may carry additional aryl groups (the polysiloxanes then being referred to as polysiloxanes carrying aralkyl groups). Where there are aralkyl groups in the polysiloxane, they contain preferably 7 to 14 carbon atoms. However, although less preferably, the polysiloxanes may also carry aryl groups. Where there are aryl groups in the polysiloxane, they preferably contain 6 to 14 carbon atoms. It is also possible to employ Si—H-functional polysiloxanes which carry both alkyl groups and aryl groups and/or aralkyl groups. Very preferably the Si—H-functional polysiloxane is a methyl-hydrogen-polysiloxane.

Monovinyl-Functional Polysiloxanes

Added onto the aforesaid Si—H-functional polysiloxanes, by means of addition reaction, more particularly hydrosilylation reaction, for example, may be a monovinyl-functional polysiloxane. The term "monovinylic" in the context of this application encompasses all species—that is compounds and polymeric species—which contain exactly one carbon-carbon double bond, that bond being terminal. The monovinyl-functional polysiloxanes may therefore be reproduced preferably by the following structural formula (I):

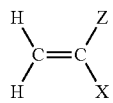
(I)

in which Z is hydrogen or an alkyl group having 1 to 4, preferably 1 or 2, carbon atoms and X is a monovalent radical of the following formula:

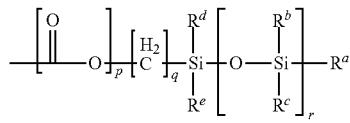

in which p=0 or 1, q=0 to 30, and r=1 to 400, preferably 5 to 200, more preferably 10 to 140, and very preferably 10 to 80, and, if p=1, q≥2, preferably q≥3, $R^a$ is a linear, halogenated or unhalogenated alkyl radical having 1 to 30 carbon atoms, a branched or cyclic, halogenated or unhalogenated alkyl radical having 3 to 30 carbon atoms, or an aryl radical having 6 to 30 carbon atoms, or an alkylaryl radical or an arylalkyl radical having 7 to 30 carbon atoms, or an alkoxyalkylene oxide-alkyl radical or alkoxypoly-alkylene oxide-alkyl radical (such as, e.g., $CH_3(OCH_2CH_2)_nO(CH_2)_3$ with n=1 to 10), all $R^b$, $R^c$, $R^d$, and $R^e$ independently of one another are a linear, halogenated or unhalogenated alkyl radical having 1 to 30 carbon atoms, a branched or cyclic, halogenated or unhalogenated alkyl radical having 3 to carbon atoms, or an aryl radical having 6 to 30 carbon atoms, or an alkylaryl radical or an arylalkyl radical having 7 to 30 carbon atoms, $R^d$ and $R^e$, moreover, independently of one another may be $R^a[SiR^bR^cO]_r$, in which $R^a$, $R^b$, $R^c$, and r are as defined above and are selected independently thereof.

If, for example, Z is hydrogen, p is 0, and q is 1, the compounds are referred to as allylpolysiloxanes; if, for example, Z is $CH_3$, p is 1, and q is 3, the compound in question is a 3-(methacryloxy)propyl-polysiloxane.

In the context of the invention, only strictly monovinyl-functional polysiloxanes—that is, those containing only one vinyl group—are used. A technique for preparing the monovinyl-functional polysiloxanes comprises the living polymerization of cyclic siloxanes, to give a polymer of controlled molecular weight; the termination is achieved, for example, by means of dialkyl(vinyl)chlorosilanes.

Linear, monovinyl-functional polysiloxanes may be synthesized, for example, via a living anionic polymerization of cyclic polysiloxanes, such as of a hexamethylenecyclotrisiloxane, for example. This process is described inter alia in T. Suzuki in Polymer, 30 (1989) 333, WO 2009/086079 A2, EP 1 985 645 A2, and US 2013/0041098 A1. The reaction is illustrated by way of example for the hexamethylenecyclotrisiloxane in the following reaction scheme:

Scheme 1

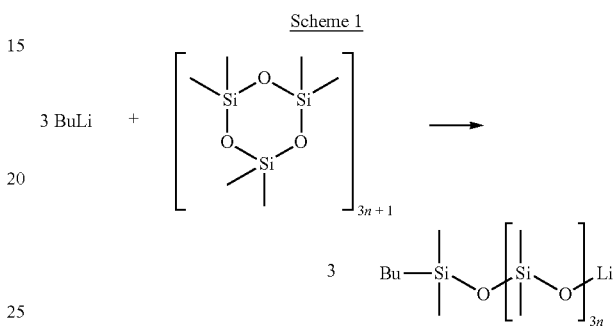

The end group may be functionalized using functional chlorosilanes, as for example dimethyl(vinyl)chlorosilane, in analogy to the following reaction scheme by processes known to a person of ordinary skill in the art.

Scheme 2

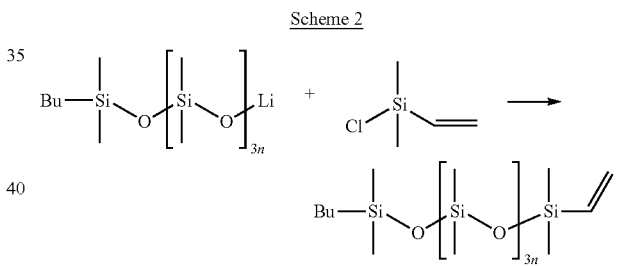

The product obtained exemplarily according to scheme 2 above corresponds to a product of formula (I) in which Z=H, p=q=0, r=3n+1, $R^b=R^c=R^d=R^e=CH_3$ and $R^a$=butyl.

If branched monovinyl-functional polysiloxanes are desired, the end group may be functionalized using monomethyl(vinyl)dichlorosilane or trichloro(vinyl)-silane, with one polysiloxane radical being introduced for each chlorine atom.

Epoxy-Functional, Monovinyl-Functional Component

This is a component essential to the invention that is different from the monovinyl-functional polysiloxanes but is likewise monovinyl-functional and which is added onto the Si—H-functional polysiloxanes.

The epoxy-functional, monovinyl-functional component may comprise compounds which contain an epoxy group and a vinyl group. Whereas compounds of this kind possess a defined structure, it is also possible for polymeric species to be used. Accordingly, between the epoxy group and the vinyl group, there may also be polymeric structural elements present, such as polyalkyleneoxy groups, for example, particularly those from ethylene oxide and/or propylene oxide.

In general the epoxy-functional, monovinyl-functional component is monoepoxy-functional.

The epoxy-functional, monovinyl-functional component is preferably aliphatic.

Preferred epoxy-functional, monovinyl-functional components may be reproduced by the structural formula (II) below:

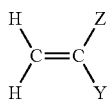

(II)

in which Z is hydrogen or an alkyl group having 1 to 4, preferably 1 or 2, carbon atoms and Y is a monovalent radical of the following formula:

-L-Epoxy

L in this formula is a linking group (also called "linker") and Epoxy is an oxirane ring, where the oxirane ring is bonded by one or both carbon atoms to the linker L. The linker L is preferably a saturated aliphatic radical, which may contain heteroatoms, preferably oxygen atoms. Very preferably it is a heteroatom-free, saturated aliphatic hydrocarbon radical. In the context of the present invention the term "aliphatic radical"—as is usual in the chemical nomenclature—embraces acyclic and cyclic aliphatic radicals.

Examples of epoxy-functional, monovinyl-functional compounds are 4-vinylcyclohexene oxide, allyl glycidyl ether, methallyl glycidyl ether, 1-methyl-4-isopropenylcyclohexene oxide, 2,6-dimethyl-2,3-epoxy-7-octene, 1,4-dimethyl-4-vinylcyclohexene oxide, vinylnorbornene monooxide, and dicyclopentadiene monooxide.

Examples of epoxy-functional, monovinyl-functional species containing polymeric structural elements are alpha-allyl-omega-glycidyloxy-polyethylene glycol and alpha-allyl-omega-glycidyloxy-polyethylene/poly-propylene glycol, and the like.

Particular preference is given in the context of the present invention to using 4-vinylcyclohexene oxide and allyl glycidyl ether.

Other Components Incorporable into the Polysiloxanes of the Invention

As well as the monovinyl-functional polysiloxane which is necessarily to be incorporated into the polysiloxanes of the invention, and the epoxy-functional, monovinyl-functional component different from said polysiloxane, it is possible for further structural units to be incorporated into the polysiloxane of the invention, said units in turn being different by definition from the aforementioned starting compounds.

The incorporation of further components is aimed in particular at fine-tuning the compatibility of the polysiloxanes of the invention with the systems in which they are employed, such as coating materials, polymeric molding compounds, and thermoplastics, for example.

Following their reaction with the Si—H-functional polysiloxane, these structural units must not contain any functional groups that are reactive toward epoxy groups. If the species of this component do contain functional groups that are reactive toward epoxy groups, then these species must be reacted with the Si—H-functional polysiloxane, with consumption of the groups that are reactive with epoxy groups, at a time before the monovinyl-functional components, in other words before hydrosilylation is carried out.

The other components, in other words those which can be incorporated optionally into the polysiloxanes of the invention, are preferably monovinyl-functional components having the following structural formula (III):

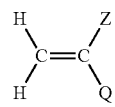

(III)

in which Z is hydrogen or an alkyl group having 1 to 4, preferably 1 or 2, carbon atoms, and Q is a monovalent radical of the following formula:

-(L')$_v$-R in which v=0 or 1,
L' is a linking group (also called "linker"), and
R is a radical —SiR$^x_n$R$^y_{3-n}$, in which
n=1 to 3,
R$^x$ independently at each occurrence is halogen, preferably chlorine, Oalkyl, preferably O—C$_{1-4}$ alkyl, more preferably Omethyl or Oethyl, or O—CO-alkyl, preferably O—CO—CH$_3$, and
R$^y$ is alkyl, preferably C$_{1-4}$ alkyl, more preferably methyl or ethyl, or is aryl having 6 to 10 carbon atoms; or
R is a polymeric radical having ether, ester and/or urethane groups.

For reasons of the storage stability of the polysiloxanes of the invention, the group Q ought preferably not to contain any groups that are reactive toward epoxy groups, more particularly no hydroxyl groups.

The linker L' is preferably a saturated aliphatic radical or an araliphatic radical. Very preferably it is a heteroatom-free, saturated aliphatic hydrocarbon radical. Very preferably L' is an alkylene radical having 1 to 12 carbon atoms or a phenylenealkylene radical having 7 to 10 carbon atoms.

It is of course also possible to use mixtures of the aforesaid optional components in order to render the compatibility of the polysiloxanes of the invention amenable to particularly effective fine-tuning of the properties.

The silanes (Q=-(L')$_v$-SiR$^x_n$R$^y_{3-n}$) of the above formula have a terminal monovinylic group, as for example a terminal alkenyl group such as a vinyl group (Z=H, v=0) or allyl group (Z=H, L'=CH$_2$, v=1) or a 5-hexenyl radical (Z=H, L'=n-C$_4$H$_8$, v=1), 7-octenyl radical (Z=H, L'=n-C$_6$H$_{12}$, v=1) or a 10-undecenyl radical (Z=H, L'=n-C$_9$H$_{18}$, v=1).

As alkoxyalkylsilane or alkylchlorosilane it is possible for example for vinyltrichlorosilane, vinyltri-tert-butoxysilane, vinyltriacetoxysilane, vinylphenylmethylmethoxysilane, vinylphenylmethyl-chlorosilane, vinylphenyldiethoxysilane, vinyldiphenyl-chlorosilane, vinyldimethylethoxysilane, vinyldimethyl-chlorosilane, 1-vinyl-3-(chloromethyl)-1,1,3,3-tetra-methyldisiloxane, vinyl(chloromethyl) dimethylsilane, vinyldimethylethoxysilane, vinyltris (methoxypropoxy)-silane, vinyltris(2-methoxyethoxy) silane, vinyltrimethoxysilane, vinyltriisopropoxysilane, vinyltri-ethoxysilane, vinylphenyldichlorosilane, vinyloctyl-dichlorosilane, vinylmethyldimethoxysilane, vinylmethyldiethoxysilane, vinylmethyldichlorosilane, vinylmethyldiacetoxysilane, vinyldiphenylethoxysilane, 5-hexenyltrichlorosilane, 5-hexenyldimethylchloro-silane, docosenyltriethoxysilane, butenyltri-ethoxysilane, butenylmethyldichlorosilane, allyltri-methoxysilane, allyltriethoxysilane, allyltrichloro-silane, allyloxyundecyltrimethoxysilane, allylmethyldi-chlorosilane, allyldimethylchlorosilane, allyl(chloro-methyl)dimethylsilane, hexenyltriethoxysilane, vinyldiphenylethoxysilane, 10-undecenyltrimethoxysilane, 10-undecenyltrichlorosilane, 10-undecenyldimethylchlorosilane, styrylethyltrimethoxysilane, 7-octenyltrimethoxysilane, 7-octenyltrimethoxysilane, 7-octenyl-dimethylchlorosilane, etc., to be used.

More preferably the radical R is a polymeric radical having ether, ester and/or urethane groups.

The compounds containing polymeric radicals (Q=-(L')$_v$-R where R=polymeric radical having ether, ester and/or urethane groups) of the above formula likewise have a terminal, monovinyl-functional group, as for example an allyloxy group (Z=H, L'=CH$_2$O, v=1).

Where an allyloxy group (CH$_2$=CH—CH$_2$—O) and a polyether radical as radical R are present, the compounds are called allyl polyethers. Allyl polyethers may be prepared by the alkoxylation of allyl alcohol or monoallyl ethers having one or more hydroxyl groups with alkylene oxides, especially ethylene oxide and/or propylene oxide and/or butylene oxide and/or styrene oxide.

Both pure alkoxylates and mixed alkoxylates may be prepared. In the case of mixed alkoxylates, the alkoxylation may be blockwise, alternating or random. The mixed alkoxylates may also contain a distribution gradient in respect of the alkoxylation.

After the synthesis, terminal hydroxyl groups that are present are blocked or masked. This may be done, for example, by etherification or esterification or by addition of a monoisocyanate. Methylation or acetylation is preferred.

Where the radical R is a polyether radical, it is preferably a polyether radical composed of ethylene oxide ([EO]), propylene oxide ([PO]) or a mixture of ethylene oxide and propylene oxide. In such a case it may be represented by the following formula:

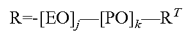

R=-[EO]$_j$—[PO]$_k$—R$^T$ where j=0-70; if j=0, k is at least 1;
where k=0-50; if k=0, j is at least 1;
where R$^T$ is an aliphatic, aromatic or araliphatic, hydroxyl-free group, as for example an alkyl group, CO-alkyl group or a CO—NH-alkyl group. The group R$^T$ contains preferably 1 to 10, more preferably 1 to 6, and very preferably 1 to 4 carbon atoms.

By means of different fractions of [EO] and [PO] units it is possible to influence the properties of the polysiloxane of the invention. Specifically, therefore, on account of the greater hydrophobicity of the [PO] units by comparison with the [EO] units, the hydrophobicity of the polysiloxanes of the invention can be controlled through the choice of suitable [EO]:[PO] ratios.

The polyether copolymers conforming to the structural formula indicated above may be random copolymers, alternating copolymers or block copolymers. A gradient may also be formed through the sequence of the alkylene oxide units.

It is possible not to use only one allyl polyether. For more effective control of the compatibility it is also possible to use mixtures of different allyl polyethers.

Where an allyloxy group (CH$_2$=CH—CH$_2$—O) and a polyester radical as radical R are present, the compounds are referred to as allyl polyesters. Allyl polyesters may be obtained by the esterification of alcohols with allylic double bond (1-alkenols, such as 5-hexen-1-ol, for example, or hydroxy-functional allyl polyethers, such as ethylene glycol monoallyl ether, diethyl glycol monoallyl ether or higher homologs, for example) with hydroxycarboxylic acids or their lactones. The esterification takes place preferably via ring-opening polymerization with propiolactone, caprolactone, valerolactone and/or dodecalactone. Methyl-substituted derivatives of the lactones, in particular, may also be used. The ring-opening polymerization takes place with caprolactone with particular preference. Both pure polyesters and mixed polyesters may be prepared. In the case of mixed polyesters, the esterification may be blockwise, alternating or random. The mixed polyesters as well may include a distribution gradient in relation to the esterification.

Like those of the allyl polyethers, the end groups of the allyl polyester are blocked or masked, by acetylation, for example.

The weight-average molecular weights of the allyl polyesters are preferably between 200 and 4000 g/mol, more preferably between 300 and 2000 g/mol, and very preferably between 400 and 1000 g/mol.

Mixed allyl (polyethers)(polyesters) may also be prepared, by, for example, carrying out a ring-opening lactone polymerization onto a hydroxy-functional allyl polyether and then blocking or masking the hydroxyl end group. Of course, an alkoxylation may also be carried out on an allyl polyester with a terminal hydroxyl group, with subsequent blocking or masking. The possibilities for combination here are multivarious.

Generally speaking, the compatibilities of the polysiloxanes of the invention can be adapted in different ways. In order for the polysiloxanes of the invention to be used, for example, in polyurethane-containing systems, corresponding urethane group-containing polymeric radicals R may be incorporated into the polysiloxanes of the invention.

Polymeric radicals such as, for example, polyether radicals, polyester radicals, polyurethane radicals or polymeric radicals containing ether, ester and/or urethane groups may also be incorporated by condensation reaction into the Si—H-functional polysiloxanes. In the case of incorporation through condensation reaction, the customary starting points are monohydroxy-functional, preferably linear, polymeric components which contain ether, ester and/or urethane groups. These components may be synthesized, in analogy to the allyl polyethers stated above, by alkoxylation of monoalcohols, and/or, by analogy to the allyl polyesters, by ring-opening polymerization of lactones onto monoalcohols. Serving as monoalcohols may be, for example, methanol, ethanol, butanol or allyl alcohol, or other starter alcohols, as for example fatty alcohols.

Preferred Polysiloxanes of the Invention

A preferred subject of the invention are polysiloxanes which may be described by the following general formula (IV):

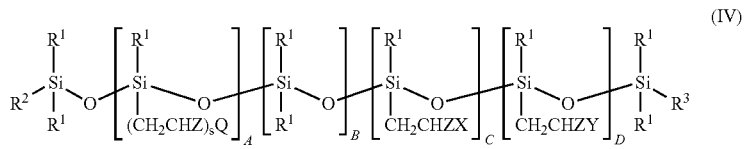

(IV)

where
X, Y, Z, and Q are as defined above,
s=0 or 1;
$R^1$ independently at each occurrence is $C_1$-$C_{14}$ alkyl, $C_6$-$C_{10}$ aryl or $C_7$-$C_{12}$ aralkyl;
$R^2$ and $R^3$ independently of one another are $CH_2CHZX$, $CH_2CHZY$ or $(CH_2CHZ)_sQ$, or are —$(R^4)_i$—$C_1$-$C_{14}$ alkyl, —$(R^4)_i$—$C_6$-$C_{14}$ aryl or —$(R^4)_i$—$C_7$-$C_{14}$ aralkyl, in which i=0 or 1 and $R^4$ is O, O—CO, O—CO—O or —$OSO_2$—:
A=0-20, preferably 0-15, more preferably 0-8,
B=2-300, preferably 10-200, more preferably 15-100, very preferably 50 to 100 such as, for example, 65 to 100,
C=0-20, preferably 1-15, more preferably 1-8, very preferably 1 to 6, and
D=0-20, preferably 1-15, more preferably 1-8, very preferably 3 to 8;
where if C=0, $R^2$=X and/or $R^3$=X, and
where if D=0, $R^2$=Y and/or $R^3$=Y.

If the unit —[$SiR^1(CH_2CHZX)$—O—]— is present, i.e., C is at least 1, then it is possible for $R^2$ and $R^3$ to be different from $CH_2CHZX$.

And, if the unit —[$SiR^1(CH_2CHZY)$—O—]— is present, i.e., D is at least 1, then it is possible for $R^2$ and $R^3$ to be different from $CH_2CHZY$.

The copolymers conforming to the structural formula indicated above may be random copolymers, alternating copolymers or block copolymers. A gradient may also be formed along the silicone backbone by the sequence of the side chains. That is, the A units of the formula —[$SiR^1((CH_2CHZ)_rQ)$-O—]—, the B units —$Si(R^1)_2$—O—, the C units —[$SiR^1(CH_2CHZX)$—O—]—, and the D units —[$SiR^1(CH_2CHZY)$—O—]— may be arranged in any desired order within the polysiloxane chain.

The polysiloxanes preferred in accordance with the invention, as may be concluded from the definitions of A, B, C, and D, contain 6 to 763 siloxane units, taking account of the siloxane units in the main chain and in the side chains. The polysiloxanes preferred in accordance with the invention preferably contain 10 to 500 siloxane units, more preferably from 20 to 250 siloxane units, and very preferably from 50 to 200 siloxane units, and more particularly 100 to 180 siloxane units.

Process for Preparing the Polysiloxanes of the Invention

The reaction regime may take place by addition onto the Si—H-functional polysiloxane, in particular by hydrosilylation, of at least one epoxy-functional, monovinyl-functional component, at least one monovinyl-functional polysiloxane and optionally at least one monovinyl-functional component different from aforementioned species, and as defined above, as a mixture of the components or in any desired order.

Hydrosilylation catalysts employed are preferably noble metals/their compounds, such as platinum, rhodium, and palladium and their compounds, more preferably platinum compounds. Especially preferred platinum compounds are hexachloroplatinic acid, alcoholic solutions of hexachloroplatinic acid, complexes with platinum and aliphatic, unsaturated hydrocarbon compounds; and platinum-vinylsiloxane complexes. It is also possible, however, to use platinum black and platinum on activated carbon. If, for example, a platinum compound is used, 1 to 50 ppm as platinum metal are preferably added.

The hydrosilylation takes place typically under the following conditions: The SiH-functional polysiloxane is introduced at room temperature. Then, under a nitrogen atmosphere, the contents of the reactor are heated for example to 85° C. to 140° C. A hydrosilylation catalyst is added, such as Karstedt catalyst or one of the other aforementioned catalysts. Depending on the anticipated exothermic nature of the reaction, some or all of the monovinyl-functional component is added. The exothermic reaction which then proceeds raises the temperature. Normally attempts are made to maintain the temperature within a range from 90° C. to 120° C. If some of the monovinyl-functional components still have to be metered in, the addition is made in such a way that the temperature remains in the range from 90° C. to 120° C. Following complete addition, the temperature is maintained for some time more at 90° C. to 120° C. The progress of the reaction may be monitored by gas-volumetric determination of the remaining SiH groups or by infrared spectroscopy (absorption band of the silicon hydride at 2150 $cm^{-1}$). If necessary, an alcoholic gelling inhibitor as described in U.S. Pat. No. 5,512,640 may be added. The polysiloxanes of the invention preferably contain no Si—H groups.

Where components are introduced via condensation reactions—for example, monohydroxy-functional components through condensation with an SiH group in the SiH-functional polysiloxane—the condensation reactions are carried out before the hydrosilylation reactions.

The polysiloxanes of the invention may also serve as intermediates for the production of further-modified additives. For instance, the polysiloxanes of the invention may subsequently be further modified completely or partially by chemical means, in order, for example, to introduce particular new reactive groups. Through at least partial reaction of the epoxy groups, with acrylic acid, for example, products can be obtained which can also be employed in radiation-curing compositions, such as UV-curing and electron beam-curing compositions, where they can be incorporated firmly into the corresponding composition, such as a radiation-curing paint, for example.

The polysiloxanes of the invention can be used, for example, in epoxide systems, epoxide-siloxane systems, polyester systems, and also in systems which crosslink on exposure to UV/EB radiation in the presence of weakly acidic donors and others.

Coating Materials, Polymeric Molding Compounds, and Thermoplastics of the Invention A further subject of the invention are compositions comprising the polysiloxanes of the invention, such as, in particular, coating materials, polymeric molding compounds or thermoplastics. Particularly preferred compositions of the invention are those which comprise epoxy resins.

The coating materials, polymeric molding compounds or thermoplastics produced with the polysiloxanes of the invention may be used in pigmented or unpigmented form, and the coating materials, polymeric molding compounds, and thermoplastics may further comprise fillers such as calcium carbonate, aluminum hydroxide, reinforcing fibers such as glass fibers, C fibers, and aramid fibers. Furthermore, the coating materials, polymeric molding compounds or thermoplastics produced with the polysiloxanes of the invention may comprise other customary additives, such as, for example, wetting and dispersing agents, light stabilizers, aging inhibitors, and the like.

The coating materials produced with the polysiloxanes of the invention preferably comprise at least one further binder different from said polysiloxanes. The coating material compositions of the invention are preferentially suitable for antigraffiti coatings, release coatings, self-cleaning façade coatings, coatings which prevent icing, coatings which repel ice, especially for aircraft, dirt-repellent coatings, for vehicle bodies or alloy rims, dirt-repellent machine and instrument coatings, dirt-repellent furniture coatings, or marine coatings such as, for example, antifouling coatings, and also dirt-repellent furniture and release-paper coatings.

The coating materials, polymeric molding compounds or thermoplastics of the invention comprise the polysiloxanes of the invention as additive in amounts from 0.1 to 10 wt %, preferably from 0.5 to 7.5 wt %, very preferably from 1 to 5 wt %, based on the total weight of the coating material, polymeric molding compound or thermoplastic.

The coating materials produced with the polysiloxanes of the invention may be applied to a host of substrates, such as, for example, wood, paper, glass, ceramic, plaster, concrete, and metal. The coatings may also be applied, in a multicoat procedure, to primers, surfacers or basecoats. The curing of the coating materials is dependent on the particular type of crosslinking, and may take place within a wide temperature range from, for example, −10° C. to 250° C. Even when cured at room temperature, surprisingly, coating materials produced with the polysiloxanes of the invention exhibit very good antiadhesive, dirt-repellent properties.

The polymeric molding compounds produced with the polysiloxanes of the invention are preferably film-forming resins, polyester resins, epoxy resins, silicone resins, epoxy-silicone resins, polyurethane resins, or mixtures of these polymers.

On account of the exceptionally good antiadhesive effect of the coatings obtained from the coating materials of the invention, even oily substances such as mineral oils, vegetable oils or oily preparations can be repelled, allowing containers coated with them to be emptied completely. Accordingly, coating material compositions additized in accordance with the invention are outstandingly suitable as internal coating materials for the coating of drums, canisters or cans.

In view of the excellent compatibility of the branched polyalkoxysiloxanes of the invention with different paint systems, they are outstandingly suitable for the production of transparent coatings.

Another subject of the invention is a method for coating a substrate selected from metal, glass, ceramic, and plastic materials by applying to the substrate a coating material composition of the invention which is crosslinked by physical drying, by reactive self-crosslinking or by reactive external crosslinking. With preference a thermal crosslinking takes place at a temperature >100° C. Another subject of the invention is the cured coating obtained accordingly. In one particular embodiment of the invention an at least partial hydrolytic crosslinking takes place in the coating if the polysiloxanes of the invention include hydrolyzable silane groups, in which case a silica network is formed on the coating surface.

Cured coatings are generally thermoset and therefore differ drastically from—for example—thermoplastic materials.

Through application of the coating materials of the invention it is possible to achieve a marked improvement in the self-cleaning properties of the surfaces. A further advantage is that other properties of such hybrid coatings, such as the leveling, the gloss, the transparency, and flexibility, for example, are not adversely affected, and in some cases aforesaid properties are in fact improved.

A further subject of the present invention, therefore, is the use of the polysiloxanes of the invention as additives for improving the antiadhesive properties of coating materials, polymeric molding compounds, and thermoplastics, more particularly the use as additive for equipping surfaces with dirt-repellent and/or self-cleaning properties. The additive is used in the amounts indicated above for coating materials, polymeric molding compounds, and thermoplastics.

The invention is to be illustrated below, using examples.

SYNTHESIS EXAMPLES

Gel Permeation Chromatography (GPC)

The gel permeation chromatography was carried out at 40° C. using an HPLC pump (Bischoff HPLC 2200) and a refractive index detector (Waters 419). The eluent used was tetrahydrofuran and the elution rate was 1 ml/min. Polystyrene standards were used for calibration. The number-average molecular weight $M_n$, the weight-average molecular weight $M_w$, the centrifuge-average molecular weight $M_c$, and the polydispersity ($=M_w/M_n$) were determined using the NTeqGPC software.

Abbreviations $M=\!\!-\!\!O_{0.5}Si(CH_3)_3$
$M^H=\!\!-\!\!O_{0.5}SiH(CH_3)_2$
$M^{Butyl}=\!\!-\!\!O_{0.5}Si(butyl)(CH_3)_2$
$D=\!\!-\!\!O_{0.5}Si(CH_3)_2O_{0.5}\!\!-\!\!$
$D^H=\!\!-\!\!O_{0.5}SiH(CH_3)O_{0.5}\!\!-\!\!$
$D^{R'}=\!\!-\!\!O_{0.5}SiR'(CH_3)O_{0.5}\!\!-\!\!$
$D^{R''}=\!\!-\!\!O_{0.5}SiR''(CH_3)O_{0.5}\!\!-\!\!$
$D^{R'''}=\!\!-\!\!O_{0.5}SiR'''(CH_3)O_{0.5}\!\!-\!\!$
$M^{CH=CH2}=\!\!-\!\!O_{0.5}Si(CH\!\!=\!\!CH_2)(CH_3)_2$ Synthesis of Monovinyl-Functional Polysiloxanes of the Following Formulae:

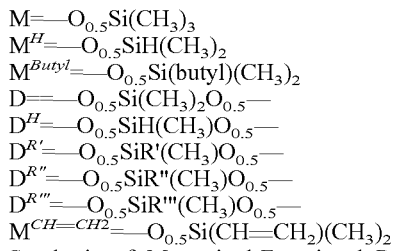

Monovinyl-terminated polydimethylsiloxanes possess an average molecular weight of 2000, 3000, 5000 and are prepared in analogy to example 1a (1st stage) of patent specification DE 10 2008 031 901 A1, with the difference that the terminal functionalization was carried out with chlorodimethylvinylsilane rather than chlorodimethylsilane.

Example 1

Reaction of a Methyl-Hydrogen-Polysiloxane Having the Mean Average Formula $MD^H{}_8D_{91}M$ with $M^{Butyl}D_{25}M^{CH=CH2}$ and Allyl Glycidyl Ether A 250 ml 3-neck flask with stirrer, thermometer, and reflux condenser is charged at room temperature with 80.57 g of a methyl-hydrogen-polysiloxane having the mean average formula $MD^H{}_8D_{91}M$ and 37.47 g of a monovinyl-functional polysiloxane having the average formula $M^{Butyl}D_{25}M^{CH=CH2}$, and this initial charge is heated to 75° C. under a nitrogen atmosphere. When this temperature has been reached, 0.26 g of Karstedt catalyst at 0.2% in xylene is added. The quantity of heat released during the reaction raises the temperature to 103° C. After 30 minutes at 100° C., the remaining Si—H groups are determined by gas volumetry and the theoretical conversion of 20 mol % is found. For the 2nd reaction stage, 0.03 g of Karstedt catalyst at 0.2% in xylene is added, and then 11.96 of allyl glycidyl ether are metered in over the course of 10 minutes, the temperature rising to 106° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

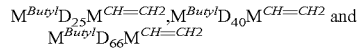

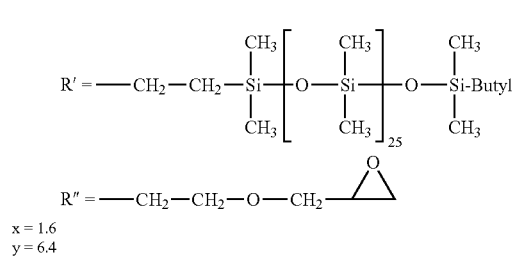

x = 1.6
y = 6.4

GPC data found for the product are as follows:
$M_w$: 18124 g/mol, $M_c$: 33679 g/mol, $M_n$: 3299 g/mol, polydispersity: 5.33

Example 2

Reaction of a Methyl-Hydrogen-Polysiloxane Having the Mean Average Formula $MD^H{}_9D_{76}M$ with $M^{Butyl}D_{25}M^{CH=CH2}$ and Allyl Glycidyl Ether A 250 ml 3-neck flask with stirrer, thermometer, and reflux condenser is charged at room temperature with 73.49 g of a methyl-hydrogen-polysiloxane having the mean average formula $MD^H{}_9D_{76}M$ and 42.84 g of a monovinyl-functional polysiloxane having the average formula $M^{Butyl}D_{25}M^{CH=CH2}$, and this initial charge is heated to 75° C. under a nitrogen atmosphere. When this temperature has been reached, 0.26 g of Karstedt catalyst at 0.2% in xylene is added. The quantity of heat released during the reaction raises the temperature to 104° C. After 30 minutes at 100° C., the remaining Si—H groups are determined by gas volumetry and the theoretical conversion of 20 mol % is found. For the $2^{nd}$ reaction stage, 0.03 g of Karstedt catalyst at 0.2% in xylene is added, and then 13.67 g of allyl glycidyl ether are metered in over the course of 10 minutes, the temperature rising to 106° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD^{R'}{}_xD^{R''}{}_yD_mM$

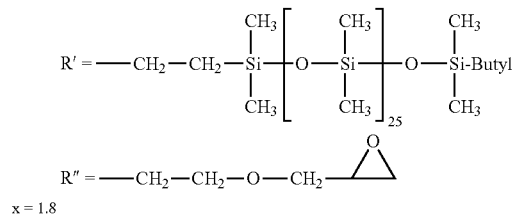

x = 1.8
y = 7.2

GPC data found for the product are as follows:
$M_w$: 19210 g/mol, $M_c$: 37623 g/mol, $M_n$: 3743 g/mol, polydispersity: 5.13

Example 3 (Comparative) (without Monovinyl-Functional Polysiloxane)

Reaction of a Methyl-Hydrogen-Polysiloxane Having the Mean Average Formula $MD^H{}_{9.5}D_{153}M$ with Allyl Glycidyl Ether In a 250 ml 3-neck flask with stirrer, thermometer, and reflux condenser at room temperature 134.27 g of a methyl-hydrogen-polysiloxane having the mean average formula $MD^H{}_{9.5}D_{153}M$ are heated to 75° C. under a nitrogen atmosphere. When this temperature has been reached, 0.33 g of Karstedt catalyst at 0.2% in xylene is added, then 16.73 g of allyl glycidyl ether are metered in over the course of 10 minutes, the temperature rising to 108° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD_{153}D^{R''}{}_{9.5}M$ where

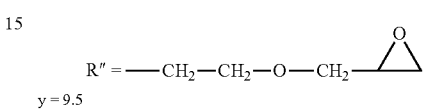

y = 9.5

GPC data found for the product are as follows:
$M_w$: 20683 g/mol, $M_c$: 37697 g/mol, $M_n$: 2571 g/mol, polydispersity: 8.04

Example 4 (Comparative) (without Monovinyl-Functional Polysiloxane)

Reaction of a Methyl-Hydrogen-Polysiloxane Having the Mean Average Formula $MD^H{}_8D_{91}M$ with Allyl Glycidyl Ether In a 250 ml 3-neck flask with stirrer, thermometer, and reflux condenser at room temperature 127.62 g of a methyl-hydrogen-polysiloxane having the mean average formula $MD^H{}_8D_{91}M$ are heated to 80° C. under a nitrogen atmosphere. When this temperature has been reached, 0.33 g of Karstedt catalyst at 0.2% in xylene is added, then 22.38 g of allyl glycidyl ether are metered in over the course of 10 minutes, the temperature rising to 105° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD_{91}D^{R''}{}_8M$ where

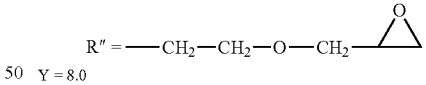

Y = 8.0

GPC data found for the product are as follows:
$M_w$: 13181 g/mol, $M_c$: 23552 g/mol, $M_n$: 2418 g/mol, polydispersity: 5.44

Example 5

Reaction of a Methyl-Hydrogen-Polysiloxane Having the Mean Average Formula $MD^H{}_8D_{91}M$ with $M^{Butyl}D_{40}M^{CH=CH2}$ and Allyl Glycidyl Ether A 250 ml 3-neck flask with stirrer, thermometer, and reflux condenser is charged at room temperature with 88.79 g of a methyl-hydrogen-polysiloxane having the mean average formula $MD^H{}_8D_{91}M$ and 47.23 g of a monovinyl-functional polysiloxane having the average formula $M^{Butyl}D_{40}M^{CH=CH2}$, and this initial charge is heated to 75°

C. under a nitrogen atmosphere. When this temperature has been reached, 0.30 g of Karstedt catalyst at 0.2% in xylene is added. The quantity of heat released during the reaction raises the temperature to 103° C. After 30 minutes at 100° C., the remaining Si—H groups are determined by gas volumetry and the theoretical conversion of 13.3 mol % is found. For the 2$^{nd}$ reaction stage, 0.03 g of Karstedt catalyst at 0.2% in xylene is added, and then 13.98 g of allyl glycidyl ether are metered in over the course of 10 minutes, the temperature rising to 106° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD^{R'}{}_{x}D^{R''}{}_{y}D_{91}M$

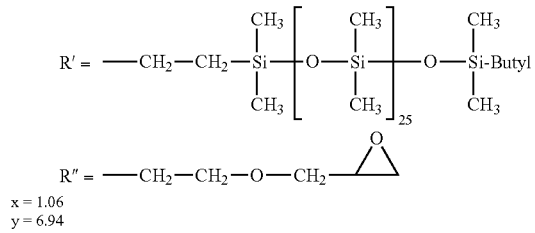

$R'' = -CH_2-CH_2-O-CH_2-$ 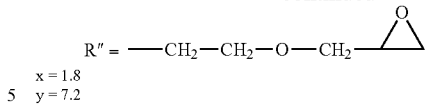

x = 1.06
y = 6.94

GPC data found for the product are as follows:
$M_w$: 17064 g/mol, $M_c$: 31429 g/mol, $M_n$: 3166 g/mol, polydispersity: 5.39

Example 6

Reaction of a Methyl-Hydrogen-Polysiloxane Having the Mean Average Formula $MD^H{}_9D_{76}M$ with $M^{Butyl}D_{40}M^{CH=CH2}$ and Allyl Glycidyl Ether A 250 ml 3-neck flask with stirrer, thermometer, and reflux condenser is charged at room temperature with 68.53 g of a methyl-hydrogen-polysiloxane having the mean average formula $MD^H{}_9D_{76}M$ and 68.72 g of a monovinyl-functional polysiloxane having the average formula $M^{Butyl}D_{40}M^{CH=CH2}$, and this initial charge is heated to 75° C. under a nitrogen atmosphere. When this temperature has been reached, 0.30 g of Karstedt catalyst at 0.2% in xylene is added. The quantity of heat released during the reaction raises the temperature to 102° C. After 30 minutes at 100° C., the remaining Si—H groups are determined by gas volumetry and the theoretical conversion of 20 mol % is found. For the 2$^{nd}$ reaction stage, 0.03 g of Karstedt catalyst at 0.2% in xylene is added, and then 12.75 g of allyl glycidyl ether are metered in over the course of 10 minutes, the temperature rising to 106° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD^{R'}{}_{x}D^{R''}{}_{y}D_{76}M$

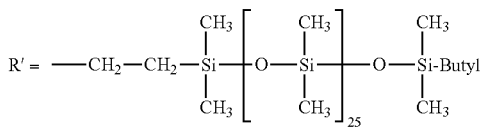

$R'' = -CH_2-CH_2-O-CH_2-$ 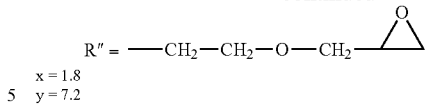

x = 1.8
y = 7.2

GPC data found for the product are as follows:
$M_w$: 20259 g/mol, $M_c$: 39641 g/mol, $M_n$: 4103 g/mol, polydispersity: 4.93

Example 7

Reaction of a Methyl-Hydrogen-Polysiloxane Having the Mean Average Formula $MD^H{}_8D_{91}M$ with $M^{Butyl}D_{66}M^{CH=CH2}$ and Allyl Glycidyl Ether A 250 ml 3-neck flask with stirrer, thermometer, and reflux condenser is charged at room temperature with 91.73 g of a methyl-hydrogen-polysiloxane having the mean average formula $MD^H{}_8D_{91}M$ and 43.17 g of a monovinyl-functional polysiloxane having the average formula $M^{Butyl}D_{66}M^{CH=CH2}$ with 57.98 of xylene and this initial charge is heated to 75° C. under a nitrogen atmosphere. When this temperature has been reached, 0.30 g of Karstedt catalyst at 0.2% in xylene is added. The quantity of heat released during the reaction raises the temperature to 101° C. After 30 minutes at 100° C., the remaining Si—H groups are determined by gas volumetry and the theoretical conversion of 8 mol % is found. At 100° C. and 45 mbar, using a water separator, 50.1 g of xylene are distilled off over the course of 20 minutes. The reduced pressure is ended by introduction of nitrogen. For the 2$^{nd}$ reaction stage, 0.03 g of Karstedt catalyst at 0.2% in xylene is added, and then 15.1 g of allyl glycidyl ether are metered in over the course of 10 minutes, the temperature rising to 107° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD^{R'}{}_{x}D^{R''}{}_{y}D_{91}M$

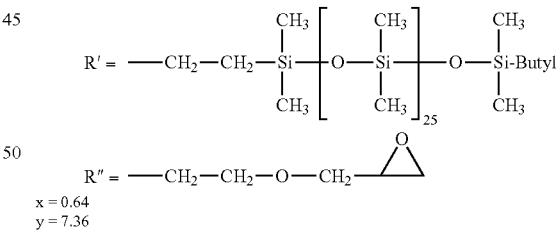

x = 0.64
y = 7.36

GPC data found for the product are as follows:
$M_w$: 19450 g/mol, $M_n$: 4287 g/mol, polydispersity: 4.53

Example 8

Reaction of a Methyl-Hydrogen-Polysiloxane Having the Mean Average Formula $MD^H{}_{24}D_{76}M$ with $M^{Butyl}D_{40}M^{CH=CH2}$, Allyl Polyether Having the Average Formula $CH_2=CH-CH_2O(CH_2-CH_2O)_6-CH_3$, and Allyl Glycidyl Ether A 250 ml 3-neck flask with stirrer, thermometer, and reflux condenser is charged at room temperature with 38.17 g of a methyl-hydrogen-polysiloxane having the mean average formula $MD^H_{24}D_{76}M$ and 55.39 g of a monovinyl-functional polysiloxane having the average formula $M^{Butyl}D_{40}M^{CH=CH2}$, and this initial charge is heated to 75° C. under a nitrogen atmosphere. When this temperature has been reached, 0.21 g of Karstedt catalyst at 0.2% in xylene is added. The quantity of heat released during the reaction raises the temperature to 100° C. After 30 minutes at 100° C., the remaining Si—H groups are determined by gas volumetry and the theoretical conversion of 20 mol % is found. For the $2^{nd}$ reaction stage, 0.17 g of Karstedt catalyst at 0.2% in xylene and also 51.93 g of xylene are added, and then 27.6 g of allyl polyether having the average formula $CH_2=CH-CH_2O(CH_2-CH_2O)_6-CH_3$ are metered in over the course of 10 minutes, the temperature rising to 101° C. After 60 minutes of subsequent reaction at 100° C., gas-volumetric determination of the remaining Si—H groups shows further conversion of 55 mol %. For the $3^{rd}$ reaction stage, 0.03 g of Karstedt catalyst at 0.2% in xylene and also 3.79 g of xylene are added and subsequently, over the course of 10 minutes, 8.84 g of allyl glycidyl ether are metered in, the temperature rising to 102° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD^{R'}_xD^{R''}_yD^{R'''}_zD_{76}M$

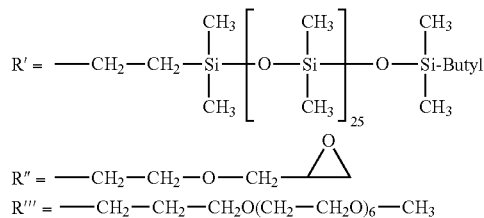

x = 4.8
y = 13.2
z = 6

GPC data found for the product are as follows:
$M_w$: 28041 g/mol, $M_n$: 3335 g/mol, polydispersity: 8.40

Example 9

Reaction of a Methyl-Hydrogen-Polysiloxane Having the Mean Average Formula $MD^H_9D_{76}M$ with $M^{Butyl}D_{66}M^{CH=CH2}$, Allyl Glycidyl Ether and Vinyltrimethoxysilane A 250 ml 3-neck flask with stirrer, thermometer, and reflux condenser is charged at room temperature with 67.45 g of a methyl-hydrogen-polysiloxane having the mean average formula $MD^H_9D_{76}M$ and 67.62 g of a monovinyl-functional polysiloxane having the average formula $M^{Butyl}D_{66}M^{CH=CH2}$, and this initial charge is heated to 75° C. under a nitrogen atmosphere. When this temperature has been reached, 0.30 g of Karstedt catalyst at 0.2% in xylene is added. The quantity of heat released during the reaction raises the temperature to 102° C. After 30 minutes at 100° C., the remaining Si—H groups are determined by gas volumetry and the theoretical conversion of 20 mol % is found. For the $2^{nd}$ reaction stage, 0.02 g of Karstedt catalyst at 0.2% in xylene is added, and then 4.56 g of allyl glycidyl ether are metered in over the course of 5 minutes. The temperature rises to 110° C. After 15 minutes of subsequent reaction at 100° C., gas-volumetric determination of the remaining Si—H groups shows conversion of a further 40 mol %. For the $3^{rd}$ reaction stage, 0.01 g of Karstedt catalyst at 0.2% in xylene are added and subsequently, over the course of 15 minutes, 10.37 g of vinyltrimethoxysilane are metered in, the temperature rising to 107° C. After 60 minutes of subsequent reaction at 100° C., gas-volumetric determination of the remaining Si—H groups shows complete conversion. In the subsequent distillation, under a reduced pressure of around 20 mbar at 130° C., all of the volatile constituents are distilled off in an hour. This gives a pale brown, clear, viscous product.

Average structure: $MD^{R'}_xD^{R''}_yD^{R'''}_zD_{76}M$

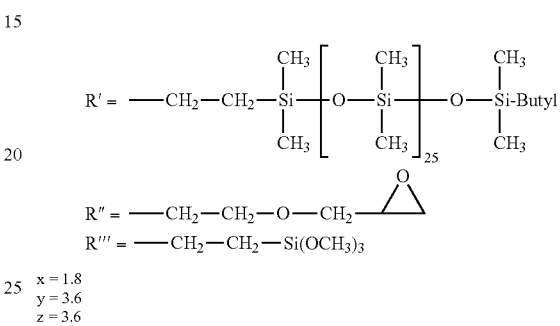

x = 1.8
y = 3.6
z = 3.6

GPC data found for the product are as follows:
$M_w$: 28041 g/mol, $M_c$: 67596 g/mol, $M_n$: 3335 g/mol, polydispersity: 8.40

Comparative Example A

Mono-SiH-functional polysiloxanes are prepared in accordance with the process described in patent specification DE 102008031901 (example 1a).
Synthesis of Monoamino-Functional Polysiloxane A four-neck flask provided with stirrer, thermometer, dropping funnel, reflux condenser, and nitrogen inlet tube is charged with mono-SiH-functional polysiloxane (250 g, Mn≈2000 g/mol) and Karstedt catalyst (4.38 g, 0.2% solution in xylene), and the components are mixed thoroughly and heated to 100° C. Allylamine (9.29 g) is added dropwise over 30 minutes. The conversion of the mono-SiH-functional polysiloxane is monitored by gas-volumetric determination. Following complete conversion, the excess allylamine is removed by distillation. The amine number measured for the product is 24.1 mg KOH/g.
Synthesis of a Copolymer Containing Polysiloxane Groups A four-neck flask provided with stirrer, thermometer, dropping funnel, reflux condenser, and nitrogen inlet tube is charged with the monoamino-functional polysiloxane from example 1 (254.7 g) and 1,6-hexanediglycidyl ether (169.6 g) and this initial charge is heated to 140° C. under nitrogen. After a reaction time of 2 hours, octylamine (75.6 g) is added slowly dropwise with stirring. The epoxide conversion is monitored by $^1$H-NMR. Following quantitative conversion of the epoxide group, the reaction is discontinued.

The product obtained here possesses an epoxy-amine structure as polymer backbone and has polysiloxane side chains bonded to the polymer backbone.

GPC data found for the product are as follows:
$M_w$: 9779 g/mol, $M_n$: 3014 g/mol, polydispersity: 3.24

Comparative Example B

A four-neck flask provided with stirrer, thermometer, dropping funnel, reflux condenser, and nitrogen inlet tube is charged with 6.10 g of Silaplane FM-0721 (mono-methacryloyl-functional polysiloxane macromer having an average molecular weight of 5000; Chisso Corporation) and 100 g of PMA and these components are thoroughly mixed. Throughout the reaction, nitrogen is passed over the mixture. The temperature is raised to 135° C. and a mixture of 1.21 g of MAA, 25.3 g of IBMA, 15.4 g of HEMA, 17.4 g of STY and 0.89 g of Trigonox C is metered in over the course of 3 hours. After the end of metering, 0.15 g of Trigonox C is added immediately. After a further 30 minutes and 60 minutes, a further 0.15 g of Trigonox C is added each time. Thereafter the batch is held at 135° C. for an hour more.

The product obtained here possesses a poly(meth)acrylate backbone as polymer backbone and has hydroxyethyl groups along the poly(meth)acrylate backbone.

GPC data found for the product are as follows:

$M_w$: 14500 g/mol, $M_n$: 3746 g/mol, polydispersity: 3.87

Comparative Example C

A four-neck flask provided with stirrer, thermometer, dropping funnel, reflux condenser, and nitrogen inlet tube is charged with 7.21 g of Silaplane FM-0721 and 119 g of propylene glycol monomethyl ether acetate and these components are thoroughly mixed. Throughout the reaction, nitrogen is passed over the mixture. The temperature is raised to 135° C. and a mixture of 32.24 g of isobutyl methacrylate, 18.76 g of glycidyl methacrylate, 21.14 g of styrene and 1.08 g of tert-butyl peroxybenzoate is metered in over the course of 3 hours. After the end of metering, 0.18 g of tert-butyl peroxybenzoate is added immediately. After a further 30 minutes and 60 minutes, a further 0.18 g of Trigonox C is added each time. Thereafter the batch is held at 135° C. for an hour more.

The product obtained here possesses a poly(meth)acrylate backbone as polymer backbone and has glycidyl groups along the poly(meth)acrylate backbone.

GPC data found for the product are as follows:

$M_w$: 16623 g/mol, $M_n$: 5381 g/mol, polydispersity: 2.63

Comparative Example D

A four-neck flask provided with stirrer, thermometer, dropping funnel, reflux condenser, and nitrogen inlet tube is charged with 7.21 g of Silaplane FM-0721 and 119 g of propylene glycol monomethyl ether acetate and these components are thoroughly mixed. Throughout the reaction, nitrogen is passed over the mixture. The temperature is raised to 135° C. and a mixture of 41.62 g of isobutyl methacrylate, 9.38 g of glycidyl methacrylate, 21.14 g of styrene and 1.08 g of tert-butyl peroxybenzoate, Akzo Nobel is metered in over the course of 3 hours. After the end of metering, 0.18 g of tert-butyl peroxybenzoate is added immediately. After a further 30 minutes and 60 minutes, a further 0.18 g of tert-butyl peroxybenzoate is added each time. Thereafter the batch is held at 135° C. for an hour more.

The product obtained here possesses a poly(meth)acrylate backbone as polymer backbone and has glycidyl groups along the poly(meth)acrylate backbone, but fewer than in comparative example C.

GPC data found for the product are as follows:

$M_w$: 12378 g/mol, $M_n$: 4850 g/mol, polydispersity: 2.55

Use Examples and Test Methods

1. Determining the Hydrophobicity of the Formulations by Measurement of the Water Contact Angle The coatings were cured at 40° C. for three days. The contact angle measurements relative to water were carried out after storage of the samples at room temperature for three days (measuring instrument: Krüss G2, Easy Drop).

2. Soiling Tests on the Formulations

The carbon black slurry test ("CB slurry test"), the carbon black handcream test ("CB cream test"), the carbon black mineral oil test ("CB oil test") and the "marker test" were carried out.

The evaluation range extends from 1 to 5, with a figure of 1 denoting "no residues", while a figure of 5 denotes "major residues".

(a) Carbon Black Slurry Test ("CB Slurry Test")

A carbon black slurry is prepared by mixing 2.0 g of Special Black 6 (Evonik), 100 g of water and 5 drops of liquid soap (Pril®). The carbon black slurry is applied to the coated metal panel using a small brush. This is followed by drying at 50° C. for 1 hour. The panels are then washed under running water, using a soft brush. Washing takes place, without using soap or relatively harsh scrubbing, until the coating has been cleaned as well as possible.

(b) Carbon Black Handcream Test ("CB Cream Test"):

A 1 weight percent preparation of carbon black powder (FW 200 from Evonik Degussa) in a handcream (Wuta camomile handcream from Herbacin Cosmetic GmbH) is prepared. This cream is rubbed with the finger onto the coated metal panels. The soiled panels are stored at room temperature overnight and then cleaned with dry paper (Tork paper hand towels from Svenska Cellulosa AB) or wet paper (soap), soaked with a 5% Pril® solution, in order to test the cleanability.

(c) Carbon Black Mineral Oil Test ("CB Oil Test"):

A 1 weight percent suspension of carbon black powder (FW 200 from Evonik Degussa) in mineral oil (Q8 Puccini 32P from Kuwait Petroleum International Lubricants) is prepared. This suspension is rubbed with the finger onto the coated metal panels. The soiled panels are stored at room temperature overnight and then cleaned with dry paper (Tork paper handtowels from Svenska Cellulosa AB) or wet paper, soaked with a 5% Pril® solution, in order to test the cleanability.

3. Marker Test

A permanent marker of type "Magic Ink Red" (available from Magic Ink Company, Japan) is used to write on the paint surface, and, after the ink has dried (1 minute), an attempt is made to wipe it off with a dry towel or with isopropanol-soaked paper. The evaluation range extends from 1 to 5, with a figure of 1 denoting "the ink can be removed without residue using a paper towel" and a figure of 5 denoting "virtually impossible to remove".

4. Measuring the Leveling of the Formulations

The leveling was measured using the Wave-Scan Dual instrument from BYK-Gardner on the coated metal panels. The longwave (LW) and the shortwave (SW) were determined.

5. Determining the Slip Resistance

Determining the slip resistance or the reduction in slip resistance was carried out using the Altek 9505 AE slip meter in accordance with performance testing method APM-001 from BYK-Chemie GmbH. For this purpose, the coating material under test was applied to glass plates which measured 10×40 cm and had been cleaned in a dishwasher beforehand. The plate is clamped into an applicator unit and positioned in such a way that a 500 g weight can be placed centrally on the coating. The weight is pushed over the sample at a speed of 5 inch/min. The measurements are carried out against a standard sample (blank sample), which is used as a reference point for the evaluation. In the evaluation, an absolute value (COF=coefficient of friction) is reported.

Coating Material Systems

Performance testing of the polysiloxanes of the invention took place in five different coating materials.

Coating Material 1

Coating Material Based on a Solvent-Based Pigmented Epoxy Resin/Polyamide Hardener System (Conventional Epoxy System)

The procedure for producing the coating material is as follows. First of all a component A is prepared by mixing the materials listed as items 1 to 3 in table 1 until homogeneity, using a dissolver with a cog disk at 2000 revolutions per minute. The corresponding quantities are reported in parts by weight in table 1. The material of item 4 in table 1 is then added and mixing takes place at 3000 revolutions per minute until a perfect gel is formed. Thereafter the materials of items 5 to 7 in table 1 are added at 3000 revolutions per minute and stirring is continued for 15 minutes more. After that the materials of items 8 to 11 in table 1 are added at 2000 revolutions per minute and stirring is continued for 5 minutes more.

Component B is produced by stirring together the materials of items 12 to 14 in table 1 for 15 minutes at 2000 revolutions per minute.

In the next step, 2 wt % of additive (inventive polysiloxane or noninventive additive), based on the sum of components A and B, is added to the mixtures of components A and B, and stirring takes place for 5 minutes at 2000 revolutions per minute.

The coating material composition is applied in a wet film thickness of 150 μm to a glass plate. The glass plate is kept at room temperature (23° C.) overnight and then dried in an oven at 40° C. for 3 days.

After it has cooled, the coating film is subjected to the test methods set out above.

TABLE 1

| Item | Component A | |
|---|---|---|
| 1 | Dowanol PM[1] | 3.9 |
| 2 | Xylene | 4.7 |
| 3 | Epikote 1001X75[2] | 15.6 |
| 4 | Bentone SD-2[3] | 1.2 |
| 5 | Disperbyk-142[4] | 0.6 |

TABLE 1-continued

| Item | | |
|---|---|---|
| 6 | Ti-Pure R902[5] | 25.0 |
| 7 | Blanc Fixe N[6] | 14.6 |
| 8 | Epikote 1001X75[2] | 23.4 |
| 9 | Solvesso 100[7] | 5.9 |
| 10 | Dowanol PM[1] | 2.4 |
| 11 | Xylene | 2.7 |
| | Total | 100.0 |
| | Component B | |
| 12 | Ancamide 220-X-70[8] | 10.0 (95.5% crosslinker) |
| 13 | Ancamine K-54[9] | 0.4 |
| 14 | Xylene | 2.0 |
| | Total | 12.4 |

[1]Dowanol PM is a propylene glycol methyl ether from Dow Chemical Company
[2]Epikote 1001X75 is a 75 wt % strength solution of an epoxy resin in xylene from Momentive
[3]Bentone SD-2 is a rheological additive based on an organically modified bentonite clay from Elementis Specialties
[4]Disperbyk-142 is a wetting and dispersing agent from Byk Chemie GmbH
[5]Ti-Pure R902 is a titanium dioxide pigment from DuPont Titanium Technologies
[6]Blanc Fixe N is a synthetic barium sulfate from Solvay Chemicals
[7]Solvesso 100 is an aromatic solvent from ExxonMobil
[8]Ancamide 220-X-70 is a hardener from Air Products
[9]Ancamine K-54 is an epoxy accelerator from Air Products Coating Material 2

Coating Material Based on a Solvent-Free Pigmented Epoxy Resin/Polyamide Epoxy Hardener System (Solvent-Free Epoxy System with High Viscosity)

The procedure for producing the coating material is as follows. First of all a component A is prepared by mixing the materials listed as items 1 to 5 in table 2 until homogeneity, using a dissolver with a cog disk at 2000 revolutions per minute. The corresponding quantities are reported in parts by weight in table 2. Thereafter the material of items 6 to 7 in table 2 is added and mixed at 3000 revolutions per minute. After that the materials of item 8 in table 2 are added at 3000 revolutions per minute and stirring is continued for 10 minutes more.

In the next step, 2 wt % of additive (inventive polysiloxane or noninventive additive), based on the sum of components A and B, is added to the mixtures of components A and B, and stirring takes place for 5 minutes at 2000 revolutions per minute.

The coating material composition is applied in a wet film thickness of 150 μm to a glass plate. The glass plate is kept at room temperature (23° C.) overnight and then dried in an oven at 40° C. for 3 days.

After it has cooled, the coating film is subjected to the test methods set out above.

TABLE 2

| Item | Component A | |
|---|---|---|
| 1 | Epikote 828[1] | 41.00 |
| 2 | Ruetasolv DI[2] | 5.00 |
| 3 | Disperbyk 2152[3] | 0.80 |
| 4 | BYK A 530[4] | 0.80 |
| 5 | BYK-310[5] | 0.10 |

TABLE 2-continued

| Item | | |
|---|---|---|
| 6 | Blanc Fixe micro[6] | 25.00 |
| 7 | Ti-Pure R960[7] | 23.00 |
| 8 | Ruetasolv DI | 4.30 |
| | Total | 100.0 |
| | Component B | |
| 9 | Epikure 3155[8] | 28.70 |
| | Total | 28.70 |

[1]Epikote 828 is an epoxy resin from Shell International Chemical Corporation
[2]Ruetasolv DI "Ruetasolv DI" is diisopropylnaphthalene from Rutgers Kureha
[3]Disperbyk 2152 is a wetting and dispersing agent from Byk Chemie GmbH
[4]BYK A 530 is a defoamer from Byk Chemie GmbH
[5]BYK-310 is a surface additive from Byk Chemie GmbH
[6]Blanc Fixe micro is a synthetic barium sulfate from Sachtleben Chemie
[7]Ti-Pure R902 is a titanium dioxide pigment from DuPont Titanium Technologies
[8]Epikure 3155 is a hardener from Momentive Coating Material 3

Coating Material Based on a Solvent-Free Pigmented Epoxy Resin/Polyamino Amide Hardener System (Solvent-Free Epoxy System with Low Viscosity)

The procedure for producing the coating material is as follows. First of all a component A is prepared by mixing the materials listed as items 1 to 4 in table 3 until homogeneity, using a dissolver with a cog disk at 2000 revolutions per minute. The corresponding quantities are reported in parts by weight in table 3. Thereafter the materials of items 5 to 6 in table 3 are added at 3000 revolutions per minute and stirring is continued for 15 minutes more. After that the materials of item 7 in table 3 are added at 2000 revolutions per minute and stirring is continued for 5 minutes more.

In the next step, 2 wt % of additive (inventive polysiloxane or noninventive additive), based on the sum of components A and B, is added to the mixtures of components A and B, and stirring takes place for 5 minutes at 2000 revolutions per minute.

The coating material composition is applied in a wet film thickness of 150 μm to a glass plate. The glass plate is kept at room temperature (23° C.) overnight and then dried in an oven at 40° C. for 3 days.

After it has cooled, the coating film is subjected to the test methods set out below.

TABLE 3

| Item | | |
|---|---|---|
| | Component A | |
| 1 | Araldite GY793 BD[1] | 41.00 |
| 2 | Disperbyk 142[2] | 1.00 |
| 3 | BYK A 530[3] | 0.80 |
| 4 | BYK 310[4] | 0.20 |
| 5 | Blancfixe micro[5] | 30.00 |

TABLE 3-continued

| Item | | |
|---|---|---|
| 6 | Ti-Pure R960[6] | 22.00 |
| 7 | Benzyl alcohol[7] | 5.00 |
| | Total | 100.0 |
| | Component B | |
| 8 | Aradur 44 BD[8] | 17.00 |
| | Total | 17.00 |

[1]Araldite GY793 BD is an epoxy resin from Huntsman
[2]Disperbyk 142 is a wetting and dispersing agent from Byk Chemie GmbH
[3]BYK A 530 is a defoamer from Byk Chemie GmbH
[5]BYK-310 is a surface additive from Byk Chemie GmbH
[6]Blanc Fixe micro is a synthetic barium sulfate from Sachtleben Chemie
[7]Ti-Pure R902 is a titanium dioxide pigment from DuPont Titanium Technologies
[8]Aradur 44 BD is a hardener from Huntsman Coating Material 4

Coating Material Based on a High-Solids Pigmented Epoxy Resin/Polyamide Hardener System (Epoxy System with High Solids Fraction and High Viscosity)

The procedure for producing the coating material is as follows. First of all a component A is prepared by mixing the materials listed as items 1 to 4 in table 4 until homogeneity, using a dissolver with a cog disk at 2000 revolutions per minute. The corresponding quantities are reported in parts by weight in table 4. Thereafter the materials of items 5 to 6 in table 4 are added at 3000 revolutions per minute and stirring is continued for 15 minutes more. After that the materials of items 7 to 9 in table 4 are added at 2000 revolutions per minute and stirring is continued for 5 minutes more.

In the next step, 2 wt % of additive (inventive polysiloxane or noninventive additive), based on the sum of components A and B, is added to the mixtures of components A and B, and stirring takes place for 5 minutes at 2000 revolutions per minute.

The coating material composition is applied in a wet film thickness of 150 μm to a glass plate. The glass plate is kept at room temperature (23° C.) overnight and then dried in an oven at 40° C. for 3 days.

After it has cooled, the coating film is subjected to the test methods set out above.

TABLE 4

| Item | | |
|---|---|---|
| | Component A | |
| 1 | Epikote 874X90[1] | 38.20 |
| 2 | BYK-A530[2] | 0.80 |
| 3 | BYK-310[3] | 0.10 |
| 4 | Disperbyk-2152[4] | 0.80 |
| 5 | Ti-Pure R960[5] | 25.40 |
| 6 | Blanc Fixe micro[6] | 25.70 |
| 7 | Epikote 834X80[7] | 4.60 |

TABLE 4-continued

| Item | | |
|---|---|---|
| 8 | MEK[8] | 2.00 |
| 9 | Dowanol PM[9] | 1.40 |
| | Total | 100.0 |
| | Component B | |
| 8 | Epikure 3155[10] | 19.74 |
| | Total | 19.74 |

[1]Epikote 874X90 is an epoxy resin from Momentive
[2]BYK A 530 is a defoamer from Byk Chemie GmbH
[3]BYK 310 is a surface additive from Byk Chemie GmbH
[4]Disperbyk 2152 is a wetting and dispersing agent from Byk Chemie GmbH
[5]Blanc Fixe micro is a synthetic barium sulfate from Sachtleben Chemie
[6]Ti-Pure R902 is a titanium dioxide pigment from DuPont Titanium Technologies
[7]Epikote 834X80 is an epoxy resin from Momentive
[8]MEK is methyl ethyl ketone
[9]Dowanol PM is propylene glycol monomethyl ether from Dow
[10]Epikure 3155 is a hardener from Momentive Coating Material 5
Coating Material Based on a High-Solids Pigmented Epoxy Resin/Polyamide Hardener System (Epoxy System with High Solids Fraction and Low Viscosity)

The procedure for producing the coating material is as follows. First of all a component A is prepared by mixing the materials listed as items 1 to 4 in table 5 until homogeneity, using a dissolver with a cog disk at 2000 revolutions per minute. The corresponding quantities are reported in parts by weight in table 5. Thereafter the materials of items 5 to 6 in table 5 are added at 3000 revolutions per minute and stirring is continued for 15 minutes more. After that the materials of items 7 to 9 in table 5 are added at 2000 revolutions per minute and stirring is continued for 5 minutes more. Subsequently, item 11 is used for dilution at 2000 revolutions per minute, and stirring is continued for 5 minutes more.

In the next step, 2 wt % of additive (inventive polysiloxane or noninventive additive), based on the sum of components A and B, is added to the mixtures of components A and B, and stirring takes place for 5 minutes at 2000 revolutions per minute.

The coating material composition is applied in a wet film thickness of 150 μm to a glass plate. The glass plate is kept at room temperature (23° C.) overnight and then dried in an oven at 40° C. for 3 days.

After it has cooled, the coating film is subjected to the test methods set out above.

TABLE 5

| Item | | |
|---|---|---|
| | Component A | |
| 1 | Epikote 874X90[1] | 38.20 |
| 2 | BYK-A530[2] | 0.80 |
| 3 | BYK-310[3] | 0.10 |
| 4 | Disperbyk-2152[4] | 0.80 |
| 5 | Ti-Pure R960[5] | 25.40 |
| 6 | Blanc Fixe micro[6] | 25.70 |
| 7 | Epikote 834X80[7] | 4.60 |

TABLE 5-continued

| Item | | |
|---|---|---|
| 8 | MEK[8] | 2.00 |
| 9 | Dowanol PM[9] | 1.40 |
| | Total | 100.0 |
| | Component B | |
| 10 | Epikure 3155[10] | 19.74 |
| | Total | 19.74 |
| | Component C | |
| 11 | Dowanol PM[9] | 8.00 |
| | Total | 8.00 |

Test Results
Coating Material 1

TABLE 6a

| Additive | CB slurry test | CB cream test Soap | CB cream test Towel | Marker test Towel |
|---|---|---|---|---|
| no additive | 3 | 5 | 5 | 5 |
| Comparative example A | 1 | 1 | 2 | 1 |
| Comparative example B | 5 | 3 | 4 | 5 |
| Comparative example C | 5 | 1 | 4 | 5 |
| Comparative example D | 5 | 5 | 5 | 5 |
| BYK 307* (comparative) | 1 | 5 | 5 | 4 |
| Example 3 (comparative) | 1 | 1 | 2 | 1 |
| Example 4 (comparative) | 1 | 1 | 2 | 1 |
| Example 1 | 1 | 1 | 1 | 1 |
| Example 2 | 1 | 1 | 1 | 1 |
| Example 5 | 1 | 1 | 1 | 1 |
| Example 6 | 1 | 1 | 1 | 1 |
| Example 7 | 1 | 1 | 1 | 1 |

*polyether-modified polysiloxane from Byk-Chemie GmbH

The results of table 6a show that by using the polysiloxanes of the invention as additive, dirt-repelling and oil-repelling surfaces are obtained whose quality is at least comparable with, if not, in certain tests, actually exceeding that of, the comparative products. Of particular surprise was that the polysiloxanes of the invention in fact have better properties than the additive of comparative example A, despite the latter, on the basis of its epoxy-amine backbone, being chemically even closer to the epoxy resin-based coating material composition of coating material 1.

TABLE 6b

| | Leveling (Lw/Sw) | COF | Marker test | Water contact angle (°) |
|---|---|---|---|---|
| no additive | 24.5/25.4 | 0.55 | 5 | 79 |
| Example 3 (comparative) | 3.9/18.0 | 0.05 | 1 | 99 |
| Example 4 (comparative) | 3.9/17.4 | 0.06 | 1 | 96 |
| Example 1 | 3.6/17.1 | 0.05 | 1 | 101 |
| Example 5 | 3.4/17.2 | 0.05 | 1 | 102 |
| Example 6 | 3.4/17.2 | 0.05 | 1 | 100 |

From the results in table 6b it can be seen that the polysiloxanes of the invention exhibit not only better leveling but also a higher water contact angle than the additives of noninventive comparative examples 3 and 4.

Coating Material 2

TABLE 7

| | CB slurry test | CB cream test | | Leveling | | Marker test | Water contact angle (°) |
|---|---|---|---|---|---|---|---|
| | | Towel | Soap | (Lw/Sw) | COF | | |
| no additive | 3 | 5 | 5 | 27.9/28.4 | 0.17 | 5 | 86 |
| Example 3 (comparative) | 1 | 1 | 1 | 32.7/27.9 | 0.06 | 1 | 99 |
| Example 4 (comparative) | 1 | 1 | 1 | 25.3/28.4 | 0.07 | 2 | 98 |
| Example 1 | 1 | 1 | 1 | 27.3/28.1 | 0.04 | 1 | 103 |
| Example 5 | 1 | 1 | 1 | 17.6/28.4 | 0.04 | 1 | 99 |
| Example 6 | 1 | 1 | 1 | 17.6/27.3 | 0.05 | 1 | 98 |

In coating material 2 as well, the polysiloxanes of the invention possess a significantly greater leveling-promoting effect in the longwave range for approximately the same water contact angle, or they possess a higher water contact angle for similar leveling.

Coating Material 3

TABLE 8

| | CB slurry test | CB cream test | | Leveling | | Marker test | Water contact angle (°) |
|---|---|---|---|---|---|---|---|
| | | Towel | Soap | (Lw/Sw) | COF | | |
| no additive | 1 | 3 | 5 | 15.1/30.7 | 0.19 | 5 | 95 |
| Example 3 (comparative) | 4 | 1 | 1 | 8.5/23.0 | 0.04 | 1 | 99 |
| Example 4 (comparative) | 1 | 1 | 1 | 7.3/23.5 | 0.04 | 1 | 93 |
| Example 1 | 1 | 1 | 1 | 8.0/23.1 | 0.04 | 1 | 97 |
| Example 5 | 1 | 1 | 1 | 9.5/25.7 | 0.04 | 1 | 97 |
| Example 6 | 2 | 1 | 1 | 9.4/25.5 | 0.05 | 1 | 100 |

Coating Material 4

TABLE 9

| | CB slurry test | CB cream test | | Leveling | | Marker test | Water contact angle (°) |
|---|---|---|---|---|---|---|---|
| | | Towel | Soap | (Lw/Sw) | COF | | |
| no additive | 1 | 5 | 5 | 6.4/12.7 | 0.14 | 5 | 82 |
| Example 3 (comparative) | 1 | 5 | 5 | 6.9/8.9 | 0.08 | 2 | 89 |
| Example 4 (comparative) | 1 | 5 | 5 | 8.6/9.8 | 0.08 | 3 | 88 |
| Example 1 | 1 | 5 | 3 | 7.7/9.1 | 0.08 | 2 | 90 |
| Example 5 | 1 | 4 | 3 | 7.5/10.0 | 0.09 | 1 | 99 |
| Example 6 | 1 | 4 | 3 | 7.8/9.9 | 0.10 | 2 | 93 |

Coating Material 5

TABLE 10

| | CB slurry test | CB cream test | | Leveling | | Marker test | Water contact angle (°) |
|---|---|---|---|---|---|---|---|
| | | Towel | Soap | (Lw/Sw) | COF | | |
| no additive | 4 | 5 | 5 | 7.1/7.6 | 0.15 | 5 | 78 |
| Example 3 (comparative) | 1 | 3 | 2 | 6.7/7.9 | 0.06 | 2 | 92 |
| Example 4 (comparative) | 1 | 5 | 3 | 5.7/7.6 | 0.07 | 1 | 88 |
| Example 1 | 1 | 3 | 1 | 5.4/7.3 | 0.07 | 1 | 93 |
| Example 5 | 1 | 2 | 1 | 6.2/8.3 | 0.09 | 1 | 93 |
| Example 6 | 1 | 2 | 1 | 6.5/9.0 | 0.08 | 1 | 98 |

The results in the table show that the polysiloxanes of the invention hydrophobize the paint surface and equip it with "easy-to-clean" properties.

The invention claimed is:

1. A polysiloxane obtained by the addition of at least one monovinyl-functional polysiloxane and at least one epoxy-functional, monovinyl-functional component onto an Si—H-functional polysiloxane, characterized in that the Si—H-functional polysiloxane is catenated, and the at least one monovinyl-functional polysiloxane possesses the formula (I):

in which

Z is hydrogen or an alkyl group having 1 to 4 carbon atoms, and

X is a monovalent radical of the following formula:

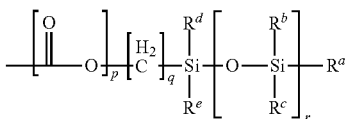

in which p=0 or 1, q=0 to 30, and r=1 to 400, and, if p=1, q 2, $R^a$ is a linear, halogenated or unhalogenated alkyl radical having 1 to 30 carbon atoms, a branched or cyclic, halogenated or unhalogenated alkyl radical having 3 to 30 carbon atoms, or an aryl radical having 6 to 30 carbon atoms, or an alkylaryl radical or an arylalkyl radical having 7 to 30 carbon atoms, or an alkoxyalkylene oxide-alkyl radical or alkoxypolyalkylene oxide-alkyl radical, all $R^b$, $R^c$, $R^d$, and $R^e$ independently of one another are a linear, halogenated or unhalogenated alkyl radical having 1 to 30 carbon atoms, a branched or cyclic, halo genated or unhalogenated alkyl radical having 3 to 30 carbon atoms, or an aryl radical having 6 to 30 carbon atoms, or an alkylaryl radical or an arylalkyl radical having 7 to 30 carbon atoms, $R^d$ and $R^e$ additionally, independently of one another, may be $R^a[SiR^bR^eO]_r$, in which $R^a$, $R^b$, $R^c$, and r are as defined above and are selected independently thereof.

2. The polysiloxane as claimed in claim 1, characterized in that the at least one epoxy-functional, monovinyl-functional component possesses the formula (II):

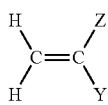
(II)

in which

Z is hydrogen or an alkyl group having 1 to 4 carbon atoms and

Y is a monovalent radical of the following formula:

-L-Epoxy in which L is a linking group and Epoxy is an oxirane ring, and where the oxirane ring is bonded by one or both carbon atoms to the linking group L.

3. The polysiloxane as claimed in claim 1, characterized in that at least one monovinyl-functional component different from the monovinyl-functional polysiloxane and from the epoxy-functional, monovinyl-functional component had been reacted with the Si—H-functional polysiloxane, and this component possesses the formula (III):

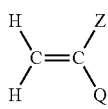
(III)

in which

Z is hydrogen or an alkyl group having 1 to 4 carbon atoms, and

Q is a monovalent radical of the following formula:

-(L')$_v$-R in which v=0 or 1,

L' is a linking group, and

R is a radical —$SiR^x{}_nR^y{}_{3-n}$, in which n=1 to 3, $R^x$ independently at each occurrence is halogen, Oalkyl, or O—CO-alkyl, and $R^y$ is alkyl or is aryl having 6 to 10 carbon atoms; or R is a polymeric radical having ether, ester and/or urethane groups.

4. A polysiloxane obtained by the addition of at least one monovinyl-functional polysiloxane and at least one epoxy-functional, monovinyl-functional component onto an Si—H-functional polysiloxane, characterized in that the at least one monovinyl-functional polysiloxane possesses the formula (I):

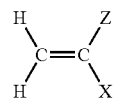
(I)

in which

Z is hydrogen or an alkyl group having 1 to 4 carbon atoms, and

X is a monovalent radical of the following formula:

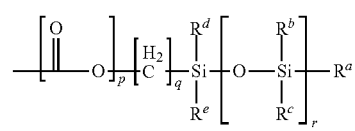

in which p=0 or 1, q=0 to 30, and r=1 to 400, and, if p=1, q≥2, $R^a$ is a linear, halogenated or unhalogenated alkyl radical having 1 to 30 carbon atoms, a branched or cyclic, halogenated or unhalogenated alkyl radical having 3 to 30 carbon atoms, or an aryl radical having 6 to 30 carbon atoms, or an alkylaryl radical or an arylalkyl radical having 7 to 30 carbon atoms, or an alkoxyalkylene oxide-alkyl radical or alkoxypolyalkylene oxide-alkyl radical, all $R^b$, $R^c$, $R^d$, and $R^e$ independently of one another are a linear, halogenated or unhalogenated alkyl radical having 1 to 30 carbon atoms, a branched or cyclic, halogenated or unhalogenated alkyl radical having 3 to 30 carbon atoms, or an aryl radical having 6 to 30 carbon atoms, or an alkylaryl radical or an arylalkyl radical having 7 to 30 carbon atoms, $R^d$ and $R^e$ additionally, independently of one another, may be $R^a[SiR^bR^cO]_r$, in which $R^a$, $R^b$, $R^c$, and r are as defined above and are selected independently thereof;

wherein at least one monohydroxy-functional polymeric component which contains ether, ester and/or urethane groups had been reacted by condensation reaction with the Si—H-functional polysiloxane before addition reactions of monovinyl-functional components onto the Si—H-functional polysiloxane were carried out.

5. A polysiloxane obtained by the addition of at least one monovinyl-functional polysiloxane and at least one epoxy-functional, monovinyl-functional component onto an Si—H-functional polysiloxane, characterized in that the at least one monovinyl-functional polysiloxane possesses the formula (I):

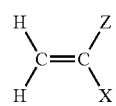
(I)

in which

Z is hydrogen or an alkyl group having 1 to 4 carbon atoms, and

X is a monovalent radical of the following formula:

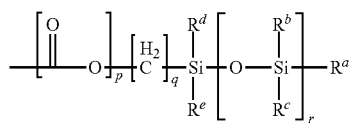

in which p=0 or 1, q=0 to 30, and r=1 to 400, and, if p=1, q≥2, $R^a$ is a linear, halogenated or unhalogenated alkyl radical having 1 to 30 carbon atoms, a branched or cyclic, halogenated or unhalogenated alkyl radical having 3 to 30 carbon atoms, or an aryl radical having 6 to 30 carbon atoms, or an alkylaryl radical or an arylalkyl radical having 7 to 30 carbon atoms, or an alkoxyalkylene oxide-alkyl radical or alkoxypolyalkylene oxide-alkyl radical, all $R^b$, $R^c$, $R^d$, and $R^e$ independently of one another are a linear, halogenated or unhalogenated alkyl radical having 1 to 30 carbon atoms, a branched or cyclic, halogenated or unhalogenated alkyl radical having 3 to 30 carbon atoms, or an aryl radical having 6 to 30 carbon atoms, or an alkylaryl radical or an arylalkyl radical having 7 to 30 carbon atoms, $R^d$ and $R^e$ additionally, independently of one another, may be $R^a[SiR^bR^cO]_r$, in which $R^a$, $R^b$, $R^c$, and r are as defined above and are selected independently thereof;

wherein the polysiloxane is further characterized in that it possesses general formula (IV):

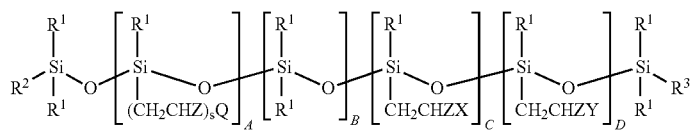

where
Y is a monovalent radical of the following formula:

-L-Epoxy in which L is a linking group and Epoxy is an oxirane ring, and where the oxirane ring is bonded by one or both carbon atoms to the linking group L;

Q is a monovalent radical of the following formula:

$-(L')_v-R$ in which v=0 or 1,
L' is a linking group, and
R is a radical $—SiR^x_nR^y_{3-n}$, in which
n=1 to 3,
$R^x$ independently at each occurrence is halogen, Oalkyl, or O—CO-alkyl, and
$R^y$ is alkyl or is aryl having 6 to 10 carbon atoms; or
R is a polymeric radical having ether, ester and/or urethane groups;
s=0 or 1;
$R^1$ independently at each occurrence is $C_1$-$C_{14}$ alkyl, $C_6$-$C_{10}$ aryl or $C_7$-$C_{12}$ aralkyl;
$R^2$ and $R^3$ independently of one another are $CH_2CHZX$, $CH_2CHZY$ or $(CH_2CHZ)_sQ$, or are $—(R^4)_i—C_1$-$C_{14}$ alkyl, $—(R^4)_i—C_6$-$C_{14}$ aryl or $—(R^4)_i—C_7$-$C_{14}$ aralkyl, in which i=0 or 1 and $R^4$ is O, O—CO, O—CO—O or $—OSO_2—$;
A=0 to 20, B=2 to 300, C=0 to 20, and D=0 to 20;
where if C=0, $R^2$=X and/or $R^3$=X, and
where if D=0, $R^2$=Y and/or $R^3$=Y.

6. A process for preparing one or more polysiloxanes as defined in claim 1, characterized in that the Si—H-functional polysiloxane in an optional first stage is partially reacted with a monohydroxy-functional, polymeric component by condensation reaction, and in a further stage is reacted with the monovinyl-functional components by hydrosilylation reactions.

7. A composition comprising one or more of the polysiloxanes as defined in claim 1.

8. The composition as claimed in claim 7, characterized in that it is a coating material, a polymeric molding compound or a thermoplastic.

9. The composition as claimed in claim 7, characterized in that the composition comprises epoxy resins.

10. The composition as claimed in claim 7, characterized in that the one or more polysiloxanes are present in a total amount of 0.1 to 10 wt %, based on the total weight of the composition.

11. A method for coating a substrate selected from metal, glass, ceramic, and plastic materials, where the composition as defined in claim 7 is applied to the substrate, the coating is physically dried and/or cured by reactive self-crosslinking and/or cured by reactive external crosslinking.

12. A coated substrate obtained by the method as claimed in claim 11.

13. A method comprising adding the polysiloxanes as defined in claim 1 to a composition selected from the group of coating materials, polymeric molding compounds, and thermoplastics for equipping the surfaces of the cured compositions with antiadhesive and/or dirt-repellent properties.

14. The composition as claimed in claim 8, characterized in that the composition comprises epoxy resins.

15. A composition comprising one or more of the polysiloxanes as defined in claim 5.

16. The composition as claimed in claim 15, characterized in that it is a coating material, a polymeric molding compound or a thermoplastic, optionally wherein the composition comprises epoxy resins.

17. The composition as claimed in claim 15, characterized in that the one or more polysiloxanes are present in a total amount of 0.1 to 10 wt %, based on the total weight of the composition.

18. A composition comprising one or more of the polysiloxanes as defined in claim 4.

19. The composition as claimed in claim 18, characterized in that it is a coating material, a polymeric molding compound or a thermoplastic, optionally wherein the composition comprises epoxy resins.

20. The composition as claimed in claim 18, characterized in that the one or more polysiloxanes are present in a total amount of 0.1 to 10 wt %, based on the total weight of the composition.

* * * * *